J. H. PHILLIPS.
HEMP AND FLAX BREAKING MACHINE.
No. 32,530. Patented June 11, 1861.
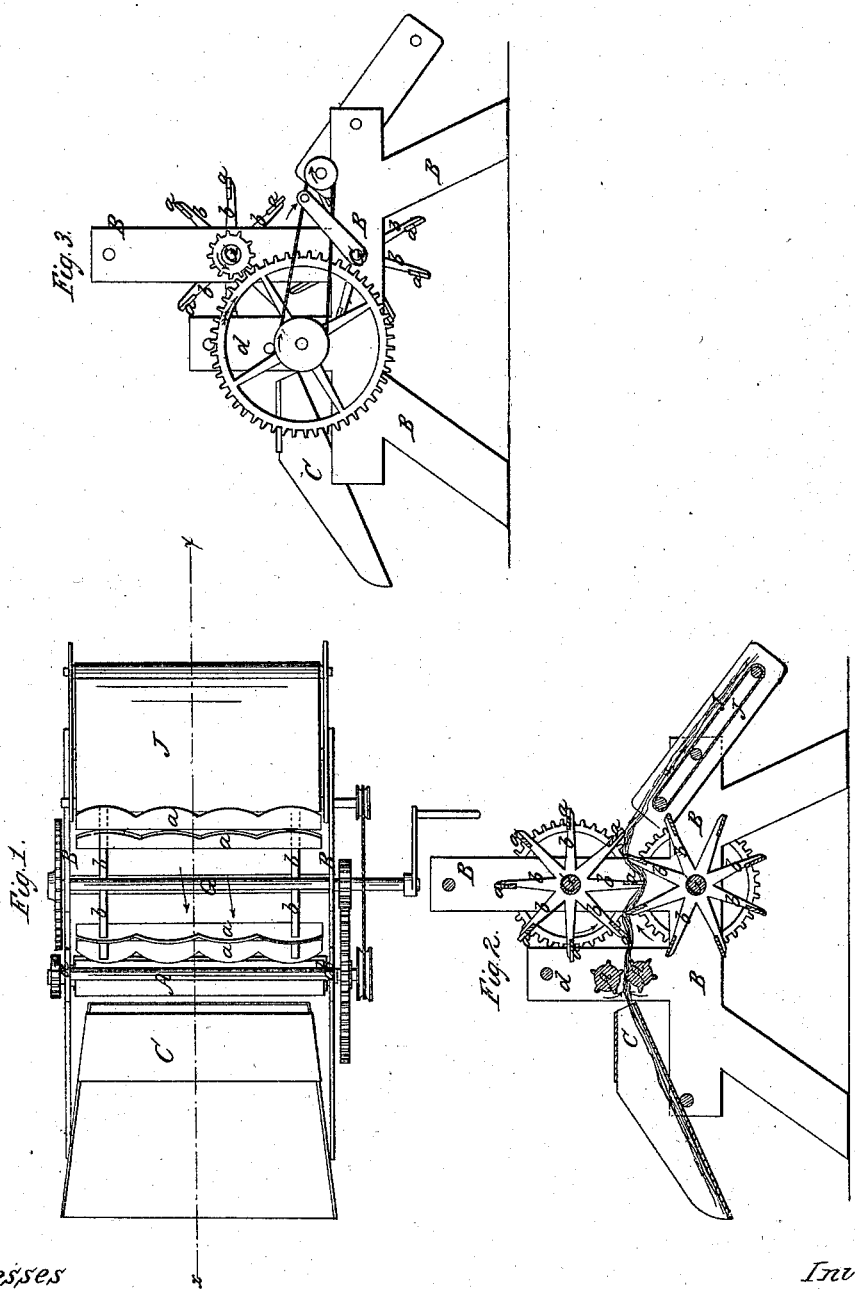

UNITED STATES PATENT OFFICE.

J. H. PHILLIPS, OF WAVERLY, MISSOURI.

IMPROVEMENT IN HEMP-BRAKES.

Specification forming part of Letters Patent No. 32,530, dated June 11, 1861.

*To all whom it may concern:*

Be it known that I, J. H. PHILLIPS, of Waverly, in the county of Lafayette and State of Missouri, have invented a new and Improved Hemp and Flax Breaking and Cleaning Machine; and I do hereby declare that the following is a full, clear, and exact description thereof, reference being had to the accompanying drawings, making a part of this specification, in which—

Figure 1 is a top view of the improved machine. Fig. 2 is a longitudinal section taken through the machine in a vertical plane indicated by the red line $xx$, Fig. 1. Fig. 3 is a side elevation of the improved brake and cleaner.

Similar letters of reference indicate corresponding parts in the three figures.

To enable those skilled in the art to make and use my invention, I will proceed to describe its construction and operation.

In the drawings, A A are two slotted breaking feed-rollers, which are mounted in two uprights, $d\ d$, of the frame B. In front of these rollers is an inclined trough, C, through which the stalks of retted and dried hemp are passed to the breaking-rollers. The rollers A A are driven at a uniform speed by suitable gearing, and as the stalks pass from the trough C between these rollers, the slats of which project radially from their surfaces and extend from end to end of each roller, they break or crush the stalks without injury to the fibers. The crushing of the stalks is the first operation, and the slats of one roller should pass between the slats of the other roller, so that the boon will be cracked over the ends of the slats, which will be in a transverse direction with the length of the stalk.

G G are two horizontal transverse shafts, having their bearings in the frame B. These shafts each carry a set of scalloped cleaning-slats, $a\ a\ a$, which are attached to the sides of radial arms $b\ b$. The slats of one shaft are so arranged that when the shafts G G are rotated they enter about midway of the slats of the other shaft, as shown in Fig. 2, so that the crushed stalks will pass in a serpentine form between the two cleaners, and as the stalks are held by the rollers A A the slats $a\ a$ will loosen and scrape off the woody matter from the fibers, and at the same time give a rapid shaking motion to the loose fibers. The outer edges of the slats $a\ a$ of both shafts G G are scalloped, as represented in Fig. 1, and as the crushed stalks are received by these slats they have the effect of spreading the fibers, and while the fibers are in this open and loose state the slats separate the woody matter from them and shake it off, as before described.

J is a continuous apron, which is kept in motion by any suitable means, and which receives the strick of fine fibers nicely cleaned of its woody particles and conduct it away from the cleaner.

Having thus described my invention, what I claim as new, and desire to secure by Letters Patent, is—

Having the edges of the cleaners $a\ a$ made in scalloped form, and so operated and geared that the scalloped blades of one wheel shall alternately pass between the blades of the opposite wheel, thus alternately elevating and depressing the hemp between the scalloped edges, all in the manner and for the purpose herein shown and described.

J. H. PHILLIPS.

Witnesses:
O. F. THOMAS,
L. SHINDLER.